Patented May 27, 1924.

1,495,616

UNITED STATES PATENT OFFICE.

FREDERICK GRANT SIMPSON, OF SEATTLE, WASHINGTON.

ART OF MEASURING THE VELOCITY OF TERRESTRIAL BODIES RELATIVE TO EACH OTHER.

No Drawing.     Application filed May 23, 1923. Serial No. 641,017.

*To all whom it may concern:*

Be it known that I, FREDERICK GRANT SIMPSON, a citizen of the United States, residing at Seattle, county of King, State of Washington, have invented a new and useful Art of Measuring the Velocity of Terrestrial Bodies Relative to Each Other; and I do hereby declare the following to be a full, clear, and exact description of the invention, such as will enable others skilled in similar arts to make use of the same.

This invention relates to a method of measuring the velocity, and direction of motion, of one terrestrial body relative to another terrestrial body, which method embodies, and applies, the Doppler-Fizeau principle, force or effect, as manifested through the medium of electro-magnetic waves.

The object of the invention is to provide a simple, and easily applied, method of ascertaining and measuring the motion of terrestrial bodies, relative to each other; which method is not restricted in its use to cases where such bodies are mechanically joined together, are touching each other, or are within visible distance of each other. The application of my method involves the use of devices for generating and measuring electro-magnetic waves and for comparing the apparent frequency of such waves, emanating from a distant source, with their frequency of generation. The difference between the observed frequency and the frequency of generation is, in accordance with the Doppler-Fizeau principle, proportional to the rate of change of the distance between the point of observation and the point of generation.

In this description I shall designate as "stationary" any body which is at rest relative to a fixed point on the surface of the earth. I shall use the term "frequency of generation," to define that frequency of electro-magnetic waves which is apparent to an observer who is at rest relative to the generator of such waves. I shall use the term "conveyance" to designate any object, in motion relative to a fixed point on the surface of the earth, which is capable of carrying such devices as are necessary for the application of my method of ascertaining its relative velocity as herein described.

For more extended discussion of the Doppler-Fizeau principle reference is made to "Physical Optics," edition of 1914, by Robert W. Wood, pages 23 to 27 inclusive.

Let it be assumed that a conveyance carrying an observer and an arrangement of radio receiving devices, constituting a heterodyne radio receiver, say one similar to that described in "The Principles of Electric Wave Telegraphy and Telephony," third edition, pages 705 to 708 partially inclusive, by J. A. Fleming; is approaching a stationary radio generating station. Let it be also assumed that the frequency of generation of the local generator carried by the conveyance, and which forms a part of the heterodyne radio receiver, is the same as the frequency of generation of the stationary generator, this condition having been attained by previous adjustment of the frequency of the two generators while both were at rest with respect to each other. If now the antenna and associated secondary circuits (exclusive of the local generator) of the heterodyne receiver are adjusted to be resonant at the apparent frequency of the electro-magnetic waves, which are intercepted from the stationary generator, there will exist in the receiver circuits an electric current having a frequency equal to the numerical difference between the frequency of generation of the stationary generator and the apparent frequency of the electro-magnetic waves, emanating therefrom, as intercepted by the radio receiver. I shall herein designate the frequency of this current as the "beat" frequency.

It may be shown; that if $c$ is the velocity of propagation of electro-magnetic waves, in meters per second; $F$ the frequency of generation of the stationary generator, in cycles per second; and, therefore, of the local generator carried by the conveyance; $f$ the apparent frequency of the electro-magnetic waves intercepted by the receiver, in cycles per second; $B$ the beat frequency, in cycles per second, which is equal to the numerical difference between $F$ and $f$; and $v$ the velocity of approach to, or recession from, the stationary generator, in meters per second, of the conveyance; that, if the conveyance is approaching the stationary generator;

$$f = F\left(1 + \frac{v}{c}\right); \quad f - F = B = \frac{Fv}{c} \text{ and } v = \frac{Bc}{F}.$$

If the conveyance is receding from the stationary generator, with velocity $v$;

$$f = F\left(1 - \frac{v}{c}\right); \quad f - F = -\frac{Fv}{c} \text{ and } v = -\frac{Bc}{F}.$$

If $F$ has the same numerical value as $c$, that is to say, if the frequency of generation is that of an electromagnetic wave of one meter length, the equations $$v \pm \frac{Bc}{F}$$

become $v \pm B$ and the velocity of the conveyance in meters per second, with respect to the stationary generator, is equal to the beat frequency in cycles per second.

The beat frequency current may be amplified in any of several well known ways and its frequency indicated by instruments of well known kinds. These instruments may be simple frequency indicators or synchronous motors, or both.

To the end that the directional bearing of the stationary generator, relative to the conveyance, may be known, directional antennæ may be provided at both the stationary generator and upon the conveyance, or upon the conveyance alone.

Let it be assumed that a conveyance carrying a generator of electromagnetic waves is approaching, or receding from, a stationary observation point which is equipped with the same arrangement of radio receiving devices as that hereinbefore described as having been carried by the conveyance. Let it be also assumed that the frequency of the local generator at the stationary observation point, and which forms a part of the heterodyne receiver, is the same as the frequency of the generator carried by the conveyance, this condition having been attained by previous adjustment of the two generators while both were at rest with respect to each other. If now the antenna and associated circuits (exclusive of the local generator) at the stationary receiving point, are adjusted to be resonant at the frequency of the electro-magnetic waves, emanating from the generator, carried by the conveyance, there will exist in the receiver circuits an electric current having a frequency equal to the numerical difference between the frequency of the generation of the generator carried by the conveyance and the frequency of the electro-magnetic waves radiated by it as apparent at the stationary point of observation. As in the previous case, I shall designate the frequency of this current as the "beat" frequency.

Using the same notation as before, it may be shown that, if the conveyance is approaching the point of observation, $$f = \frac{Fc}{c - v}.$$

If the conveyance is receding from the point of observation $$f = \frac{Fc}{c + v}.$$

Therefore $$B = f - F = \frac{Fv}{c - v}$$

when the conveyance is approaching the point of observation and $$-\frac{Fv}{c + v}$$

when the conveyance is receding therefrom. As $v$ is small with respect to $c$, it may be dropped from the denominators of the last terms of the two last equations making $$B \doteq \pm \frac{Fv}{c} \text{ and } v \doteq \pm \frac{Bc}{F}.$$

If $F$ has the same numerical value as $c$, as was assumed in the previous case $v \doteq \pm B$ as before.

The directional bearing of the conveyance, relative to the stationary point of observation, may be ascertained by the use of directional antennæ on the conveyance and at the point of observation or at the latter point alone.

It is obvious that many other arrangements of radio devices may be used to indicate the beat frequency and, therefore, the required velocity. As an instance; a receiver, previously calibrated to show the frequency of the waves to which it is resonant at its various adjustments may be substituted for the heterodyne receiver herein described. In this case the difference between the marked adjustment of the receiver when resonant at the frequency of the incoming waves, relative to the point of observation, and the known frequency of generation of the distant generator is equal, numerically, to the beat frequency. It may also be seen that electro-magnetic waves of the order of the visible spectrum may be theoretically utilized in place of the longer radio waves, for the purpose of this invention; such use, however involves measurements of great precision of minute quantities and requires the substitution of well known optical devices for producing, measuring and comparing the frequency of such waves in place of the radio frequency devices hereinbefore described.

I am aware of previous utilization of the Doppler-Fizeau principle in connection with astronomical observations including the measurement of velocities of celestial bodies with respect to the earth, such velocities being indicated by their effect upon the frequency of electro-magnetic waves, of the order of light waves, emanating from such bodies. My invention departs from all previous use of the Doppler-Fizeau principle, as relative to the measurement of velocities, in its application to the measurement of velocities of a different order of magnitude from that of those involved in its previous use and in the further utilization of its effect, as manifested through the medium of electro-magnetic waves of frequencies of the order of those used for the purpose of radio communication; thereby providing a method of measurement of velocities of great precision.

While the scope of this invention includes the use of electro-magnetic waves of all frequencies, for the purpose herein defined, I prefer to use such waves having frequencies of the order of those classed as radio frequencies and especially frequencies of approximately three hundred million cycles per second.

While I have described certain forms and arrangements of apparatus, my invention is not to be limited to any particular form of apparatus, or the arrangement thereof.

What I claim as new and desire to secure by Letters Patent of the United States is:

1. The method of measuring the velocity of a terrestrial body with respect to another terrestrial body, which consists in comparing the frequency of generation of a generator of electromagnetic waves, at rest with respect to one of the bodies, with the frequency of the electromagnetic waves radiated by such generator as measured at a point at rest with respect to the other body.

2. The method of measuring the relative velocity of two terrestrial bodies, which consists in comparing the frequency of electromagnetic waves, as measured at a point at rest with respect to one of said bodies, with the frequency of said electromagnetic waves as measured at a point at rest with respect to the other body.

3. The method of measuring the relative velocity of two terrestrial bodies, which consists in generating electromagnetic waves of known frequency at a point at rest with respect to one of said bodies, receiving said electromagnetic waves at a point at rest with respect to the other of said bodies and comparing the known frequency of the generated electromagnetic waves with the measured frequency of the received electromagnetic waves.

Seattle, Wash. May 18th, 1923.

FREDERICK GRANT SIMPSON.